United States Patent [19]

Hathaway

[11] 4,410,119

[45] Oct. 18, 1983

[54] DEVICE FOR PRODUCING SHARD FROM METAL RIBBON

[75] Inventor: Robert E. Hathaway, Dover, N.J.

[73] Assignee: Allied Corporation, Morris Township, Morris County, N.J.

[21] Appl. No.: 288,593

[22] Filed: Jul. 30, 1981

[51] Int. Cl.³ .............................................. B26F 3/00
[52] U.S. Cl. ...................................... 225/4; 83/356.3; 225/97; 225/103
[58] Field of Search ............................ 225/4, 103, 97; 83/356.3, 355, 349, 906; 29/4.5 R, 419 R

[56] References Cited

U.S. PATENT DOCUMENTS

| | | | |
|---|---|---|---|
| 1,011,736 | 12/1911 | Brown, Jr. | 225/103 |
| 3,149,765 | 9/1964 | Horning et al. | 225/97 |
| 3,504,516 | 4/1970 | Sundberg | 225/4 X |
| 3,602,410 | 8/1971 | Dennis et al. | 225/4 |
| 3,710,842 | 1/1973 | Mobley et al. | 164/78 |
| 3,935,775 | 2/1976 | Sato | 83/356.3 X |
| 4,044,640 | 8/1977 | Gokyu | 83/356.3 X |
| 4,190,095 | 2/1980 | Bedell | 164/87 |
| 4,197,146 | 4/1980 | Frischmann | 148/31.55 |
| 4,212,343 | 7/1980 | Narasimhan | 164/64 |

FOREIGN PATENT DOCUMENTS

| | | | |
|---|---|---|---|
| 2638751 | 3/1977 | Fed. Rep. of Germany | 83/356.3 |
| 1386596 | 3/1975 | United Kingdom | 83/356.3 |

Primary Examiner—Frank T. Yost
Attorney, Agent, or Firm—Michael J. Weins; Gerhard H. Fuchs

[57] ABSTRACT

The present invention is a device for reducing metallic ribbon to shard. The device has a slotted anvil for passing the ribbon therethrough. An impact surface is provided which passes in close proximity to the anvil and strikes the ribbon as it exits from the anvil.

8 Claims, 3 Drawing Figures

DEVICE FOR PRODUCING SHARD FROM METAL RIBBON

DESCRIPTION

1. Field of Invention

The present invention relates to a device for, and a method for, fragmenting metallic ribbon.

2. Background Art

U.S. Pat. No. 3,710,482 issued to Mobley et al. teaches that by providing grooves or mounds, on a chill surface, which are substantially transverse to the direction of travel of the chill surface it is possible to directly cast subdivided filaments.

While this technique has been demonstrated by Mobley et al. to provide a method for the production of subdivided high sectional modulus filaments cast in channels which intersect the mounds or grooves, it has been found that grooves placed in a flat chill substrate, transverse to the direction of travel of the substrate, tend to destabilize the stream, and make casting of short filament sections unpredictable. Channels used in conjunction with the grooves, as was the case for all the examples given in the Mobley et al. patent, help maintain the stability of the stream during casting.

The magnitude of the problem of stabilization of the impinging stream will be a function of many variables such as the ability of the liquid stream to wet the wheel. However, in all cases the transverse grooves tend to destabilize the stream, and at a minimum this destabilization produces regions where the ribbon is not in contact with the chill surface. These non-contact regions produce a variation in the solidification rate and promote inhomogeneities in the chemistry and/or structure of the resulting material.

U.S. Pat. No. 4,212,343 issued to Narasimhan discloses the use of chill surfaces having protuberances and/or indentations, however, these surfaces when used in conjunction with a slotted nozzle produced contoured continuous metal strip. This patent teaches away from adding protuberances and/or indentations to reduce the thickness of the resulting ribbon.

U.S. Pat. No. 4,197,146 issued to Frischmann discloses a method for producing oblated spheroids by employing insulating regions to mask the region over which solidification will not occur. The incorporation of the insulating material into the wheel surface makes resurfacing the wheel difficult.

For the above reasons it has been the practice to cast flat ribbon and thereafter to fracture the ribbon into filaments when it is desired to make homogeneous rapidly solidified segments or shards. However since the as cast ribbon is frequently ductile and may be folded back into itself without fracture, forming segments may require embrittlement of the ribbon prior to segmenting the ribbon to form shard. Furthermore it has not been possible to form shard in an inline operation with ribbon casting apparatus.

SUMMARY OF THE INVENTION

The present invention provides a device for forming planar shard from metallic ribbon and is capable of in-line operation with ribbon casting equipment. The device has an anvil having a slot therethrough. The slot has a width and thickness to accommodate the ribbon. The thickness of the ribbon is the minimal dimension. The device includes at least one impact surface with means to provide a path to bring the impact surface in close proximity to the anvil and to provide a motion to the impact surface such that the impact surface impacts the ribbon on the minimal dimension and transverses a path which is substantially parallel, at the point of impact, to the anvil face. A means is provided to advance the ribbon through the slot in the anvil.

Ribbon is broken into shard by advancing the ribbon through the slotted anvil and impacting the ribbon with the impact surface as the ribbon exits the anvil. The direction of motion of the impact surface is chosen to provide a moment in the plane of the ribbon, and the impact is sufficient to fracture the ribbon.

BEST MODE FOR CARRYING THE INVENTION INTO PRACTICE

Figure 1:
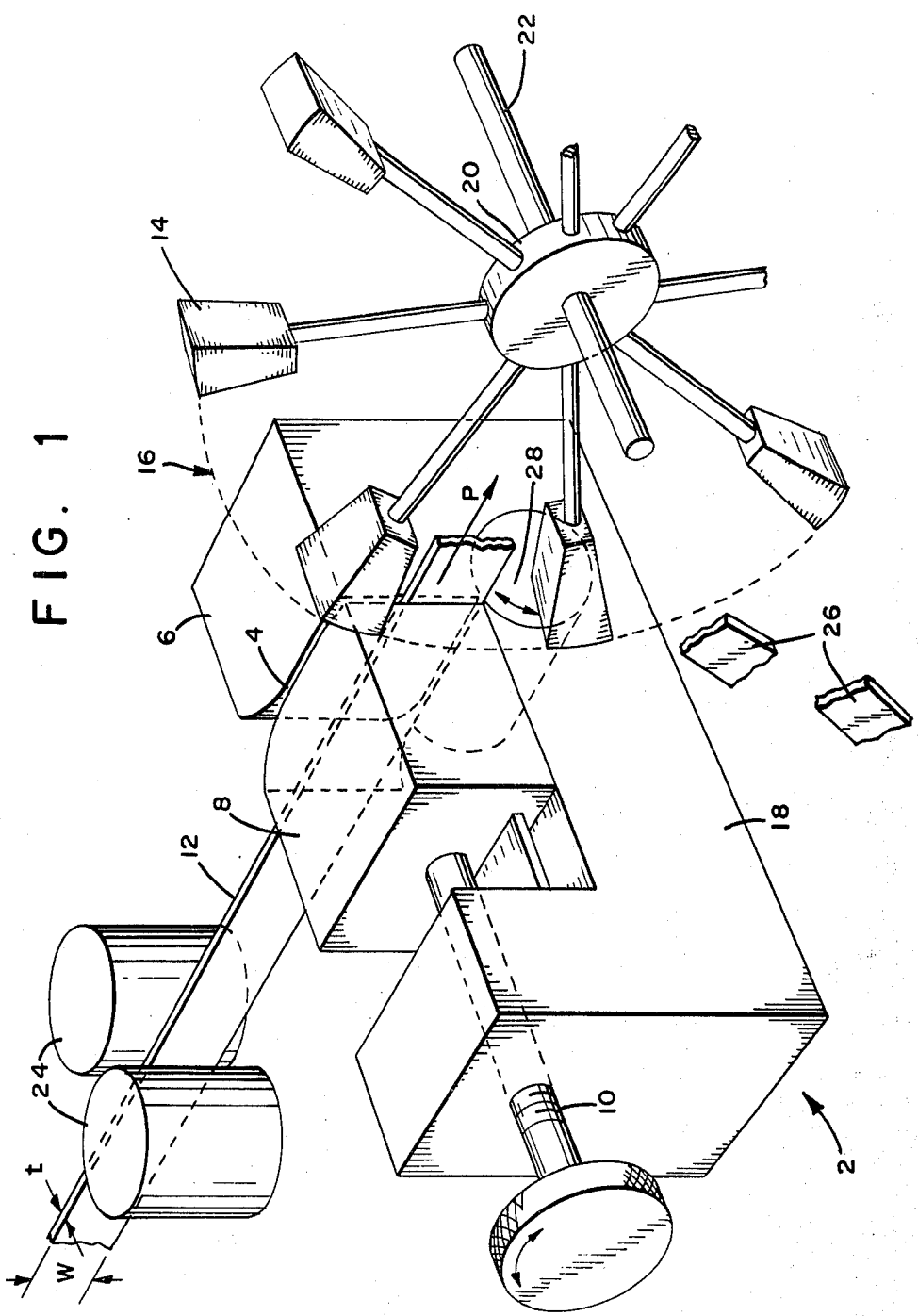
FIG. 1 is a schematic representation of one embodiment of the present invention in which multiple impact surfaces are employed.

Referring to the FIG. 1, an anvil 2 having a slot 4 therethrough. The anvil 2 has a stationary jaw 6 and a movable jaw 8 which provide for adjustment of the width of the slot 4. The movable jaw 8 is positioned with an augar 10 which is threaded through the anvil 2. The slot 4 is adjusted to stabilize a metallic ribbon 12. The ribbon 12 has a width w which is substantially greater than its thickness t. In general the thickness of rapidly solidified ribbon will be less than 250 microns. At least one impact surface 14 transverses a path 16 shown by the broken-line which is substantially parallel at the point of impact to the anvil face 18 through which the ribbon 12 exits. As illustrated in the FIG. 1 multiple impact surfaces 14 can be employed which are mounted on a hub 20 which rotates on a shaft 22. The shaft 22 may be driven by a motor not shown. The hub 20 and associated shaft 22 serve as a means for regulating the path 16 of the impact surface(s) 14. Other means could be employed to impart the required motion to the impact surface(s) 14 (e.g. slide linkage mechanism or a cam drive). The ribbon 12 is advanced by a pair of rollers 24. Multiple roller pairs may be employed to provide closer guidance of the ribbon. Roll brushes can be substituted for the rolls 24. The brushes will more readily facilitate slip between the ribbon 12 and the brushes making the control of their speed less critical than for paired rolls. Other methods for the advancement of the ribbon might include an aspirating nozzle through which the ribbon is passed and is accelerated by gas passing therethrough. A further discussion of means for advancing the filament or ribbon is contained in U.S. Pat. No. 4,190,095.

As the ribbon 12 advances it is impacted by impact surface(s) 14 which impart a moment in the plane of the ribbon 12. This moment causes the ribbon 12 to fracture forming shard 26. The length of the shard 26 can be regulated by adjusting the rate of advance of the ribbon 12 and/or by changing the rate at which the impact surface(s) 14 impacts the ribbon 12. For the device illustrated in FIG. 1 this could be accomplished by changing either the number of impact surfaces 14 and/or the rate of rotation of the shaft 22.

To prevent excess wear of the anvil a rotating seat 28 can be employed to support the ribbon 12 while it is being impacted by the impact surface(s) 14.

Figure 2:
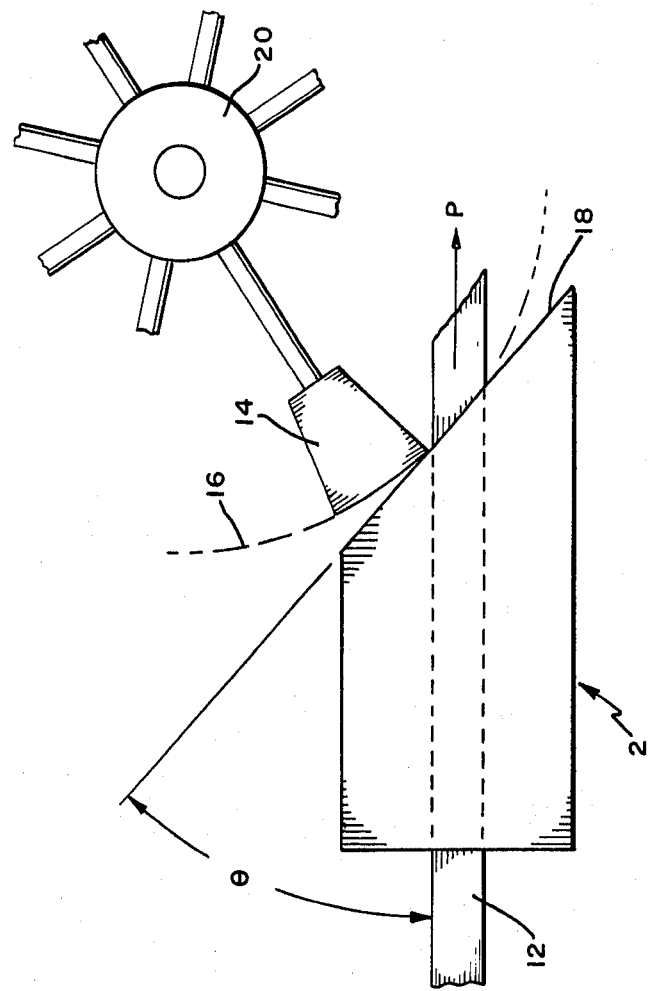
FIG. 2 is a schematic view of a cross-section of one embodiment of the present invention.

Referring to FIG. 2 the anvil face 18 of the anvil 2 through which the ribbon 12 exits makes an angle with the ribbon's path p. Preferably this angle is less than 45° and greater than 10°. This angle will assure that the motion of the impact device 14 has a component of its velocity which is parallel to the direction of motion of the ribbon 12. By properly tuning the speed of the impact surface(s) 14 to the advance rate of the ribbon 12 it is possible to assure that the component of the velocity of the impact surface(s) 14 will match that of the ribbon 12 and avoid buckling of the ribbon 12 at it advances.

For the embodiment of FIG. 1 the axis of the rotating shaft 22 is parallel to the anvil outlet face 18. It is possible to employ other geometries without departing from the spirit of the invention.

Figure 3:
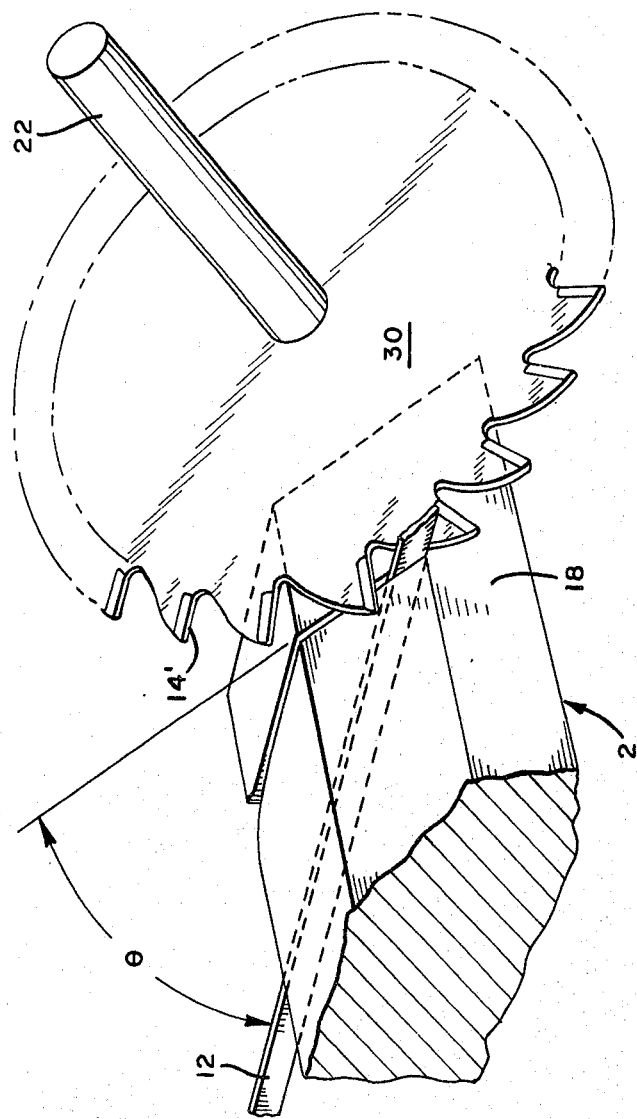
FIG. 3 is a schematic representation of an alternate embodiment of the present invention in which the axis of rotation of the impact device is perpendicular to the anvil face through which the ribbon exists.

FIG. 3 shows one alternate configuration where the axis of rotation 22 of the impact device 14 is perpendicular to the anvil face 18 through which the ribbon 12 exits. In this embodiment the impact surface 14 and hub 20 form an integral unit. This type of impact device could be a circular saw 30 with carbide teeth 14' as shown in FIG. 3. The carbide teeth 14' service as the impact surfaces. Again it is preferred that the anvil outlet surface 18 makes an angle which is preferably less than 45° and greater than 10° with respect to the direction of motion of the ribbon 12. The circular saw face 30 is substantially parallel to the anvil face 18.

What I claim is:

1. A device for forming shards from an advancing metal ribbon having a thickness and a width with the thickness the minimal dimension comprising:

an anvil having a slot connecting an inlet surface and an outlet surface, where said slot possessing a width and thickness sufficient to accommodate said ribbon provides support thereto;

at least one impact surface which transverses a path, said path bringing said impact surface into contact with the minimal dimension of the ribbon to provide a moment in the plane of the ribbon;

means for regulating said path of said impact surface to provide a path where said impact surface passes in close proximity to said outlet surface of said anvil and provides a motion to said impact surface which is substantially parallel to said outlet surface at the point of closest proximity to said outlet surface; and means for advancing said ribbon through said slot.

2. The device of claim 1 wherein said means to feed said ribbon is at least one pair of feed rollers.

3. The device of claim 2 wherein at least two impact surfaces are radially mounted on a rotating shaft which provide means for regulating said path of said radial impact surfaces, said shaft being positioned to provide an arc transversed by said impact surfaces which pass in close proximity to said outlet surface of said anvil an is substantially normal to the thickness of said ribbon.

4. The device of claim 3 wherein said slot is tapered having a thickness which monotonically decreases in the direction of advancement of said ribbon.

5. The device of claim 4 wherein said outlet surface of said anvil and said direction of advancement for said ribbon forms an angle of less than 45° to aid in the advancement of said ribbon.

6. The device of claim 5 wherein said impact surfaces are saw teeth on a radial saw blade and said saw blade is substantially parallel to said outlet surface.

7. A method for forming shard from a metallic ribbon having a width and thickness with the thickness being the minimum dimension comprising the steps of:

advancing the ribbon through a slot which passes through an anvil, and impacting the minimal dimension of the ribbon as the ribbon exits the anvil with an impact surface to provide a moment in the plane of the ribbon sufficient to fracture the ribbon.

8. The method of claim 7 wherein the ribbon has a thickness of less than 250 microns and is produced by rapid solidification.

* * * * *